(12) United States Patent
Waghole

(10) Patent No.: US 8,498,966 B1
(45) Date of Patent: Jul. 30, 2013

(54) SYSTEMS AND METHODS FOR ADAPTIVELY PERFORMING BACKUP OPERATIONS

(75) Inventor: Mahesh Waghole, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/484,255

(22) Filed: May 30, 2012

(51) Int. Cl.
*G06F 7/00* (2006.01)
*G06F 17/00* (2006.01)

(52) U.S. Cl.
USPC .......................................................... 707/645

(58) Field of Classification Search
USPC .................... 707/640, 645, 999.204
See application file for complete search history.

(56) References Cited

U.S. PATENT DOCUMENTS

| 2005/0131990 | A1* | 6/2005 | Jewell | 709/201 |
| 2007/0185938 | A1* | 8/2007 | Prahlad et al. | 707/204 |
| 2011/0252208 | A1* | 10/2011 | Ali et al. | 711/162 |

* cited by examiner

*Primary Examiner* — Aleksandr Kerzhner
(74) *Attorney, Agent, or Firm* — ALG Intellectual Property, LLC

(57) ABSTRACT

A computer-implemented method for adaptively performing backup operations may include 1) identifying a storage system used for storage by at least one application, 2) identifying a request to perform a backup operation including at least one input/output operation on the storage system, 3) determining that an input/output capacity of the storage system has fallen below a predetermined threshold, and 4) delaying the input/output operation in response to determining that the input/output capacity of the storage system has fallen below the predetermined threshold. Various other methods, systems, and computer-readable media are also disclosed.

20 Claims, 6 Drawing Sheets

SYSTEMS AND METHODS FOR ADAPTIVELY PERFORMING BACKUP OPERATIONS

BACKGROUND

In the digital age, organizations increasingly rely on digitally-stored data. To protect against data loss, an organization may use a backup system to back up important data. For example, a backup system may create a snapshot of a volume of data and copy the snapshot data to backup media.

Unfortunately, backup operations may consume significant amounts of computing resources. For instance, backups may consume I/O bandwidth as the data to be backed up is read from a storage device. Additionally, the more data there is to backup, the longer backups may take to perform. By competing for computing resources, backups may sometimes interfere with the performance of primary applications. In some cases, multiple computing systems (physical or virtual) may share a storage system. Accordingly, backups may increase I/O latency for each of the computing systems. Where multiple virtual machines share a datastore within a datastore cluster, increasing the I/O load on the datastore may trigger an I/O load balancing system to migrate files between datastores in the datastore cluster, thereby further interfering with primary application performance.

Accordingly, the instant disclosure identifies and addresses a need for additional and improved systems and methods for adaptively performing backup operations.

SUMMARY

As will be described in greater detail below, the instant disclosure generally relates to systems and methods for adaptively performing backup operations by monitoring the I/O load on a storage system and slowing and/or temporarily pausing backup activity when the I/O load reaches certain levels. In one example, a computer-implemented method for adaptively performing backup operations may include 1) identifying a storage system used for storage by at least one application, 2) identifying a request to perform a backup operation including at least one input/output operation on the storage system, 3) determining that an input/output capacity of the storage system has fallen below a predetermined threshold, and 4) delaying the input/output operation in response to determining that the input/output capacity of the storage system has fallen below the predetermined threshold.

In some examples, the storage system may include a storage cluster for a plurality of virtual machines and the backup operation may be for backing up a first virtual machine within the plurality of virtual machines. In these examples, a second virtual machine within the plurality of virtual machines may include the application.

In some embodiments, the backup operation may include reading a snapshot of data to back up from the storage system. For example, the request to perform the backup operation may include a request to copy a snapshot from the storage system to a backup storage location, and the input/output operation may include a read operation performed on the storage system. In some examples, the request to perform the backup operation may include a request to restore a backup to the storage system and the input/output operation may include a write operation to the storage system.

In one example, determining that the input/output capacity of the storage system has fallen below the predetermined threshold may include monitoring an input/output load on the storage system. In some embodiments, delaying the input/output operation may include reducing a bandwidth of input/output operations performed by the backup operation. Additionally or alternatively, delaying the input/output operation may include pausing the backup operation.

In some examples, the computer-implemented method may also include 1) adding the determination that the input/output capacity of the storage system has fallen below the predetermined threshold to an input/output load history for the storage system and 2) adjusting a backup schedule for at least one future backup operation involving the storage system based on the input/output load history for the storage system. In some embodiments, the computer-implemented method may also include 1) determining that the input/output capacity of the storage system has exceeded an additional predetermined threshold and 2) expediting an additional input/output operation for the backup operation based on determining that the input/output capacity of the storage system has exceeded the additional predetermined threshold.

In one embodiment, a system for implementing the above-described method may include 1) an identification module programmed to identify a storage system used for storage by at least one application, 2) a request module programmed to identify a request to perform a backup operation including at least one input/output operation on the storage system, 3) a determination module programmed to determine that an input/output capacity of the storage system has fallen below a predetermined threshold, and 4) a delay module programmed to delay the input/output operation in response to determining that the input/output capacity of the storage system has fallen below the predetermined threshold. The system may also include at least one processor configured to execute the identification module, the request module, the determination module, and the delay module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a storage system used for storage by at least one application, 2) identify a request to perform a backup operation including at least one input/output operation on the storage system, 3) determine that an input/output capacity of the storage system has fallen below a predetermined threshold, and 4) delay the input/output operation in response to determining that the input/output capacity of the storage system has fallen below the predetermined threshold.

As will be explained in greater detail below, by monitoring the I/O load on a storage system and slowing and/or temporarily pausing backup activity when the I/O load reaches certain levels, the systems and methods described herein may help to ensure that backup operations do not interfere with primary application operations, including cases in which multiple physical machines and/or virtual machines are configured to share a single storage system. Furthermore, these systems and methods may prevent costly load-balancing operations where multiple virtual machines share datastores within a datastore cluster.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
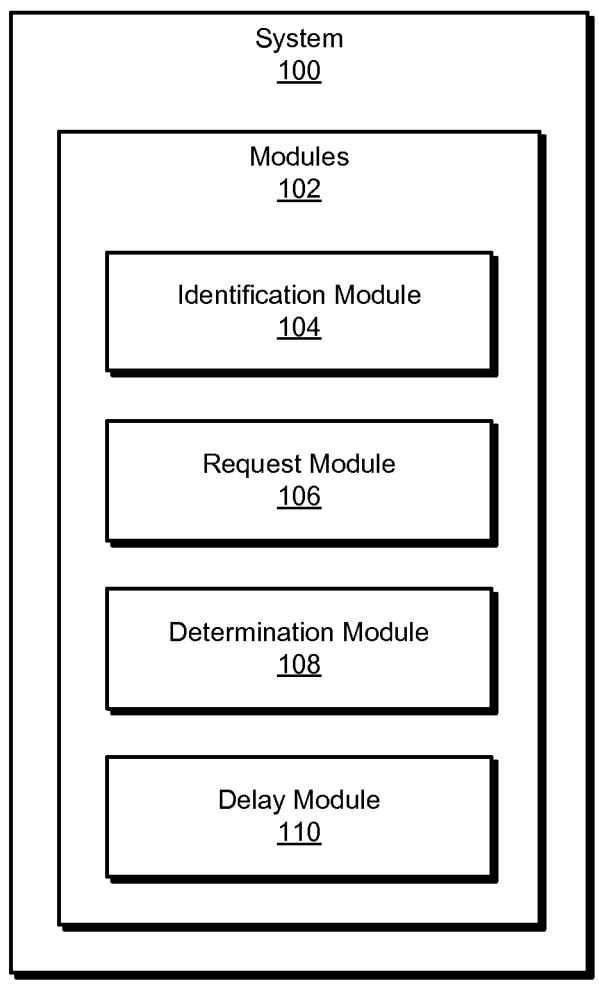
FIG. 1 is a block diagram of an exemplary system for adaptively performing backup operations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
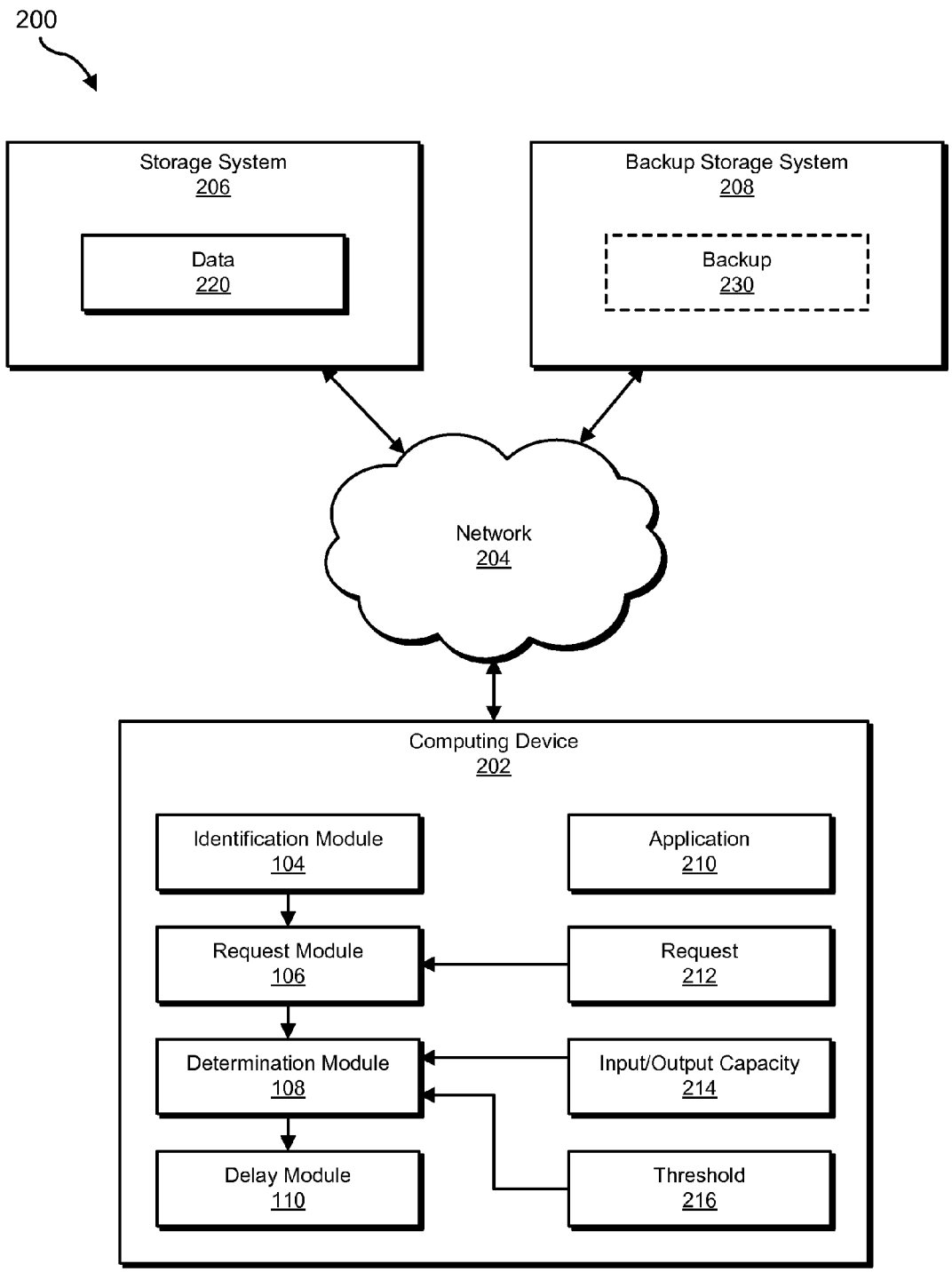
FIG. 2 is a block diagram of an exemplary system for adaptively performing backup operations.
Figure 3:
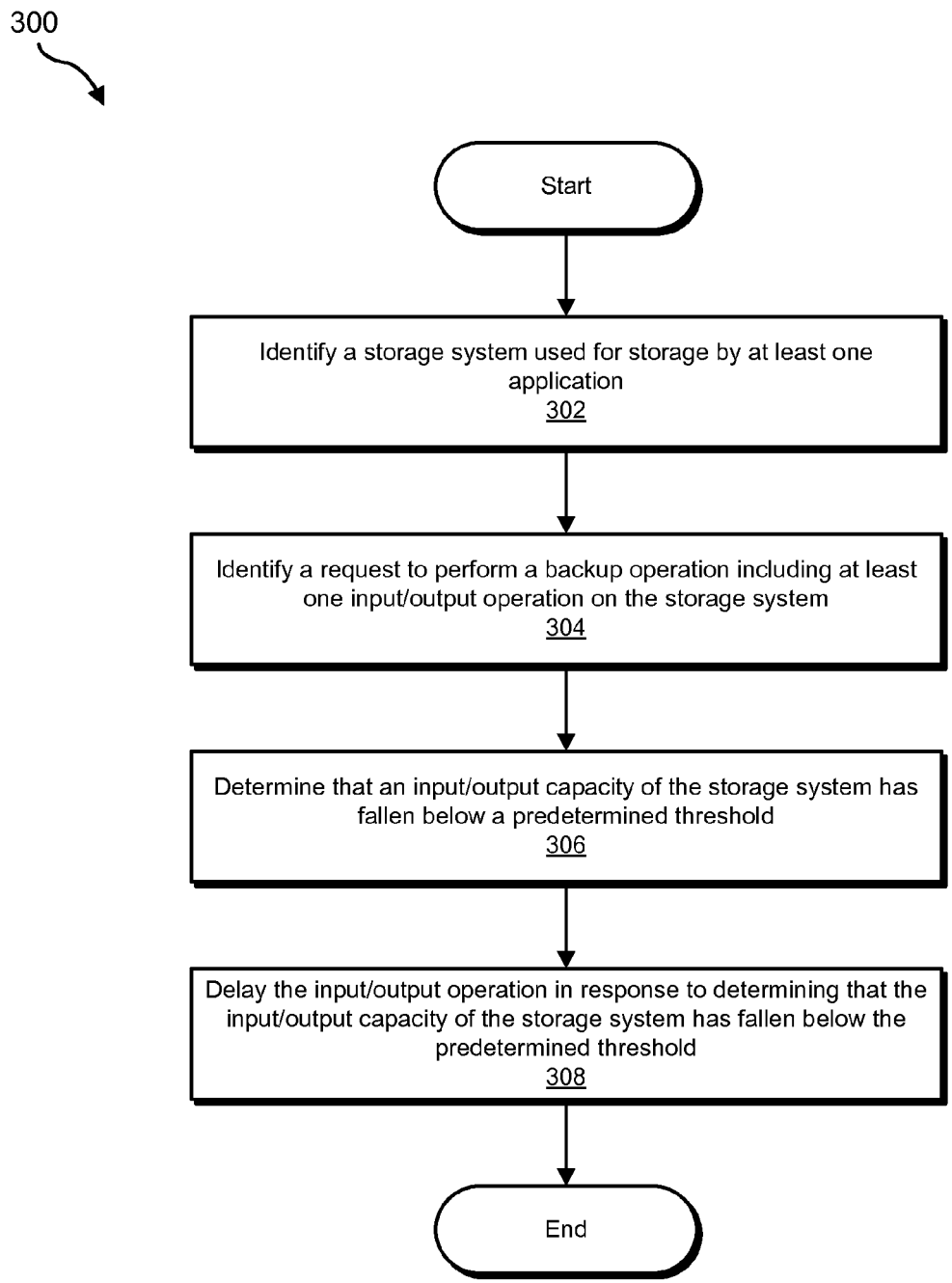
FIG. 3 is a flow diagram of an exemplary method for adaptively performing backup operations.
Figure 4:
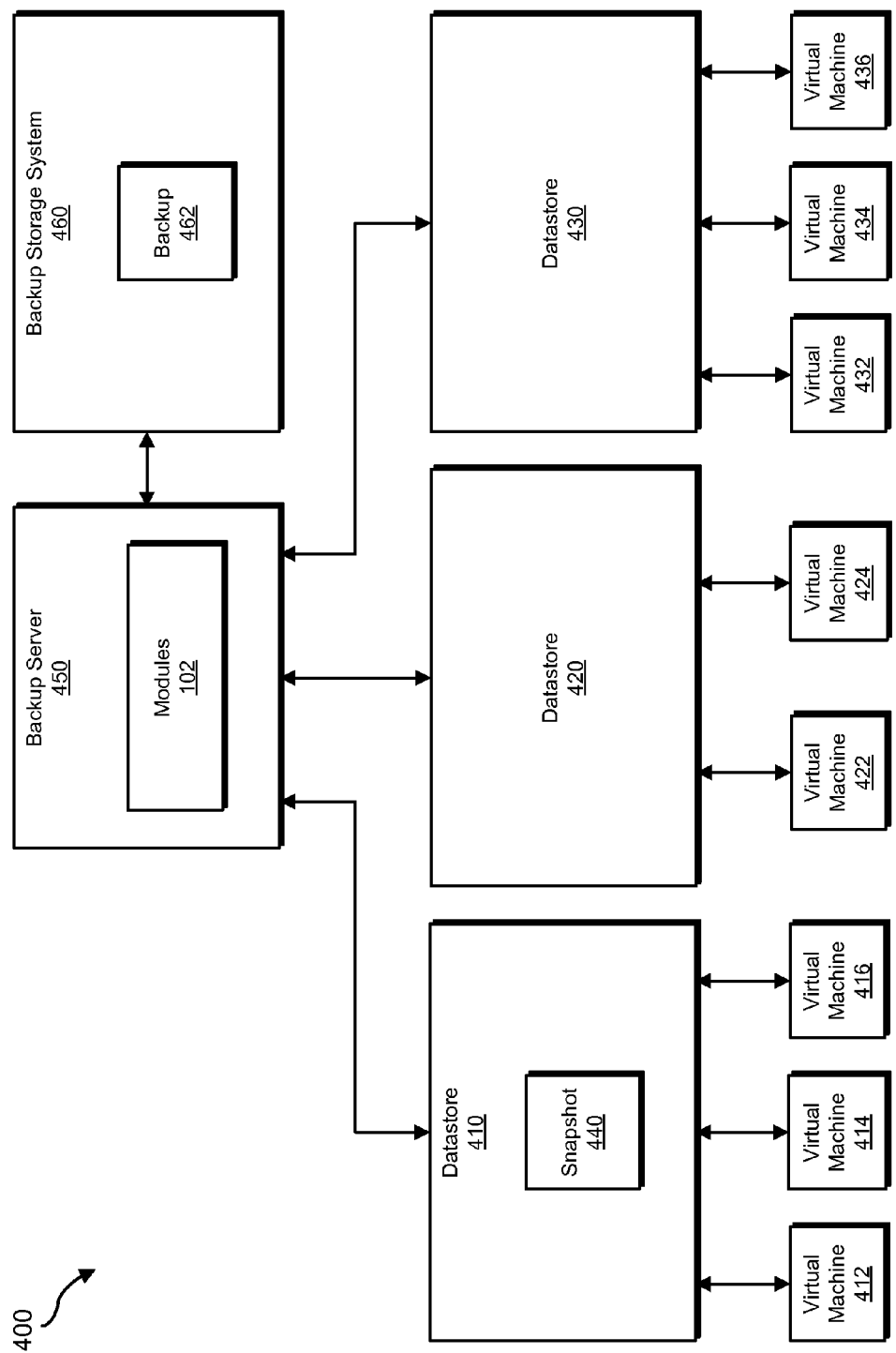
FIG. 4 is a block diagram of an exemplary system for adaptively performing backup operations.

The following will provide, with reference to FIGS. 1, 2, and 4, detailed descriptions of exemplary systems for adaptively performing backup operations. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for adaptively performing backup operations. As illustrated in this figure, exemplary system 100 may include one or more modules 102 for performing one or more tasks. For example, and as will be explained in greater detail below, exemplary system 100 may include an identification module 104 programmed to identify a storage system used for storage by at least one application. Exemplary system 100 may also include a request module 106 programmed to identify a request to perform a backup operation including at least one input/output operation on the storage system.

In addition, and as will be described in greater detail below, exemplary system 100 may include a determination module 108 programmed to determine that an input/output capacity of the storage system has fallen below a predetermined threshold. Exemplary system 100 may also include a delay module 110 programmed to delay the input/output operation in response to determining that the input/output capacity of the storage system has fallen below the predetermined threshold. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, storage system 206, and/or backup storage system 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a storage system 206 and a backup storage system 208 via a network 204 (e.g., for storing and backing up data 220 for an application 210).

In one embodiment, one or more of modules 102 from FIG. 1 may, when executed by at least one processor of computing device 202, facilitate computing device 202 in adaptively performing backup operations. For example, and as will be described in greater detail below, one or more of modules 102 may cause computing device 202 to 1) identify storage system 206 used for storage by application 210, 2) identify a request 212 to perform a backup operation including at least one input/output operation on storage system 206, 3) determine that an input/output capacity 214 of storage system 206 has fallen below a predetermined threshold 216, and 4) delay the input/output operation in response to determining that input/output capacity 214 of storage system 206 has fallen below threshold 216.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Storage system 206 may represent portions of a single storage device or a plurality of storage devices. For example, storage system 206 may represent a portion of computing system 510 in FIG. 5 and/or portions of exemplary network architecture 600 in FIG. 6.

Backup storage system 208 may represent portions of a single storage device or a plurality of storage devices. For example, backup storage system 208 may represent a portion of computing system 510 in FIG. 5 and/or portions of exemplary network architecture 600 in FIG. 6.

Network 204 generally represents any medium or architecture capable of facilitating communication or data transfer. Examples of network 204 include, without limitation, an intranet, a storage area network (SAN), a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for adaptively performing backup operations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a storage system used for storage by at least one application. For example, at step 302 identification module 104 may, as part of computing device 202 in FIG. 2, identify storage system 206 used for storage by application 210.

As used herein, the phrase "storage system" may refer to any storage device, group of storage devices, and/or portion of a storage device with a limited I/O capacity. In some examples, the phrase "storage system" may refer to one or more datastores. In some examples, the storage system may be used simultaneously by more than one physical machine, more than one virtual machine, and/or more than one application. For example, the storage system may include a storage cluster for a plurality of virtual machines. In at least one example, the storage system may provide I/O capacity information.

As used herein, the term "application" may refer to any machine, operating system, primary application, and/or production application capable of storing data on and/or retrieving data from the storage system. As mentioned earlier, in some examples, a plurality of virtual machines may use the storage system for storage. In one example, as will be described in greater detail below, a backup operation may be configured for backing up data for a first virtual machine within the plurality of virtual machines. In this example, the application may operate from a different virtual machine. For example, a second virtual machine within the plurality of virtual machines may include the application.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

Identification module 104 may identify the storage system in any suitable manner. For example, identification module 104 may identify the storage system by identifying a backup operation configured to back up data from the storage system. Additionally or alternatively, identification module 104 may identify the storage system by identifying a network topology that includes the storage system.

FIG. 4 illustrates an exemplary system 400 for adaptively performing backup operations. As shown in FIG. 4, exemplary system 400 may include data stores 410, 420, and 430 storing data for virtual machines 412, 414, 416, 422, 424, 432, 434, and 436. Using FIG. 4 as an example, at step 302 identification module 104 may, as a part of a backup server 450, identify datastore 410 (and/or a storage device corresponding to datastore 410).

Returning to FIG. 3, at step 304 one or more of the systems described herein may identify a request to perform a backup operation including at least one input/output operation on the storage system. For example, at step 304 request module 106 may, as part of computing device 202 in FIG. 2, identify request 212 to perform a backup operation including at least one input/output operation on storage system 206.

As used herein, the phrase "backup operation" may refer to any operation related to backing up data, backed up data, and/or implementing backup policies (e.g., including backing up data, restoring data, replicating data, archiving data, etc.). In some examples, the backup operation may include reading a snapshot of data to back up from the storage system. As used herein, the term "snapshot" may refer to any representation of a volume and/or a portion of a volume in a certain state and/or point in time.

As mentioned earlier, in some examples, a plurality of virtual machines may use the storage system for storage. In these examples, the backup operation may be configured for backing up data for a first virtual machine within the plurality of virtual machines, and a second virtual machine within the plurality of virtual machines may include the application. Accordingly, the backup operation may be configured to back up data for one virtual machine while potentially affecting the performance of the virtual machine being backed up or another virtual machine sharing the same storage system.

The input/output operation may include any operation that may affect the load on the storage system and/or the performance of an application using the storage system. In some examples, the request to perform the backup operation may include a request to copy a snapshot from the storage system to a backup storage location. In these examples, the input/output operation may include a read operation performed on the storage system (e.g., for reading from the snapshot). Likewise, in some examples the request to perform the backup operation may include a request to restore a backup to the storage system. In these examples, the input/output operation may include a write operation to the storage system (e.g., from the backup).

The backup operation may be configured to execute in any suitable context. For example, the backup operation may be configured to execute from a computing system that uses the storage system for storage. Additionally or alternatively, the backup operation may be configured to execute from a separate computing system (e.g., a backup server and/or appliance).

Request module 106 may identify the request to perform the backup operation in any suitable context. For example, request module 106 may identify the request to perform the backup operation by identifying a backup policy and/or schedule indicating that the backup operation is to be performed. In some examples, request module 106 may identify the request to perform the backup operation by receiving a message that the backup operation is going to be performed, has initiated, and/or is in progress. Additionally or alternatively, request module 106 may intercept and/or observe one or more elements of the backup operation being initiated and/or in progress.

Using FIG. 4 as an example, at step 304 request module 106 may, as a part of backup server 450, identify a request to back up data stored by virtual machine 414 on datastore 410. For example, request module 106 may identify a request to back up a snapshot 440 to a backup storage system 460, creating a backup 462.

Returning to FIG. 3, at step 306 one or more of the systems described herein may determine that an input/output capacity of the storage system has fallen below a predetermined threshold. For example, at step 306 determination module 108 may, as part of computing device 202 in FIG. 2, determine that input/output capacity 214 of storage system 206 has fallen below predetermined threshold 216.

Determination module 108 may determine that the input/output capacity of the storage system has fallen below the predetermined threshold in any of a variety of ways. For example, determination module 108 may determine that the input/output load has fallen below the predetermined threshold by monitoring an input/output load on the storage system. In some examples, determination module 108 may monitor the input/output load by querying the storage system for the input/output load. Additionally or alternatively, determination module 108 may estimate the input/output load by monitoring network traffic to and/or from the storage system. In some examples, determination module 108 may monitor the input/output load by monitoring the input/output performance of the storage system. For example, determination module 108 may monitor the input/output latency of one or more attempted input/output operations by the application.

In some examples, the predetermined threshold may include a threshold used to separate two or more tiers of input/output capacity of the storage system. For example, the systems and methods described herein may determine whether the storage system is at near maximum load (e.g., 95% of maximum capacity by bandwidth), high load (e.g., 80% of maximum capacity by bandwidth), moderate load (e.g., 50% of maximum capacity by bandwidth), or low load. As will be explained in greater detail below, the systems and methods described herein may use such tiers to determine how to adapt the backup operation to the storage system.

Using FIG. 4 as an example, at step 306 determination module 108 may determine that the input/output capacity of datastore 410 (and/or an underlying storage device) has fallen below a predetermined threshold (e.g., due at least in part to the backup operations of backup server 450 and/or one or more applications on virtual machines 412, 414, and 416).

Returning to FIG. 3, at step 308 one or more of the systems described herein may delay the input/output operation in response to determining that the input/output capacity of the storage system has fallen below the predetermined threshold. For example, at step 308 delay module 110 may, as part of computing device 202 in FIG. 2, delay the input/output operation in response to determining that input/output capacity 214 of storage system 206 has fallen below threshold 216.

Delay module 110 may delay the input/output operation in any of a variety of ways. For example, delay module 110 may reduce a bandwidth of input/output operations performed by the backup operation. For example, delay module 110 may reduce the rate at which read requests are issued to the storage system for reading from a snapshot stored on the storage system. As mentioned earlier, in some examples one or more of the systems described herein may distinguish between a variety of capacity tiers of the storage system. Accordingly, these systems may adjust the speed of the backup operation I/O according to the capacity tier.

In some examples, delay module 110 may delay the input/output operation by pausing the backup operation. For example, delay module 110 may create a checkpoint in the backup operation, stop the backup operation for a predefined duration (e.g., 15 minutes, until I/O capacity of the storage system reaches a predetermined level, etc.), and resume the backup operation from the checkpoint after the predefined duration.

Using FIG. 4 as an example, at step 308 delay module 110 may slow the rate of requests by backup server 450 for reading from snapshot 440. Additionally or alternatively, delay module 110 may pause read requests from snapshot 440 for a period of time (e.g., until the I/O capacity of datastore 410 is restored to an acceptable level).

In some examples, delay module 110 may also use the observed input/output capacity of the storage system for future backup operations. For example, delay module 110 may add the determination that the input/output capacity of the storage system has fallen below the predetermined threshold to an input/output load history for the storage system. Delay module 110 may then adjust a backup schedule for at least one future backup operation involving the storage system based on the input/output load history for the storage system. For example, delay module 110 may determine that the input/output capacity of the storage system was low at noon. Delay module 110 may accordingly use this observation (e.g., in concert with other observations) to reschedule backup operations that were schedule for noon on future days.

In some examples, delay module 110 may also restore backup operation speed based on increased I/O capacity of the storage system. For example, delay module 110 may determine that the input/output capacity of the storage system has exceeded an additional predetermined threshold. In this example, delay module 110 may expedite an additional input/output operation for the backup operation based on determining that the input/output capacity of the storage system has exceeded the additional predetermined threshold. For example, delay module 110 may issue (or allow the issuance of) read requests to the storage system for the backup operation more quickly. Additionally or alternatively, delay module 110 may resume the backup operation based on determining that the input/output capacity of the storage system has exceeded the additional predetermined threshold.

As explained above, by monitoring the I/O load on a storage system and slowing and/or temporarily pausing backup activity when the I/O load reaches certain levels, the systems and methods described herein may help to ensure that backup operations do not interfere with primary application operations, including cases in which multiple physical machines and/or virtual machines are configured to share a single storage system. Furthermore, these systems and methods may prevent costly load-balancing operations where multiple virtual machines share datastores within a datastore cluster.

Figure 5:
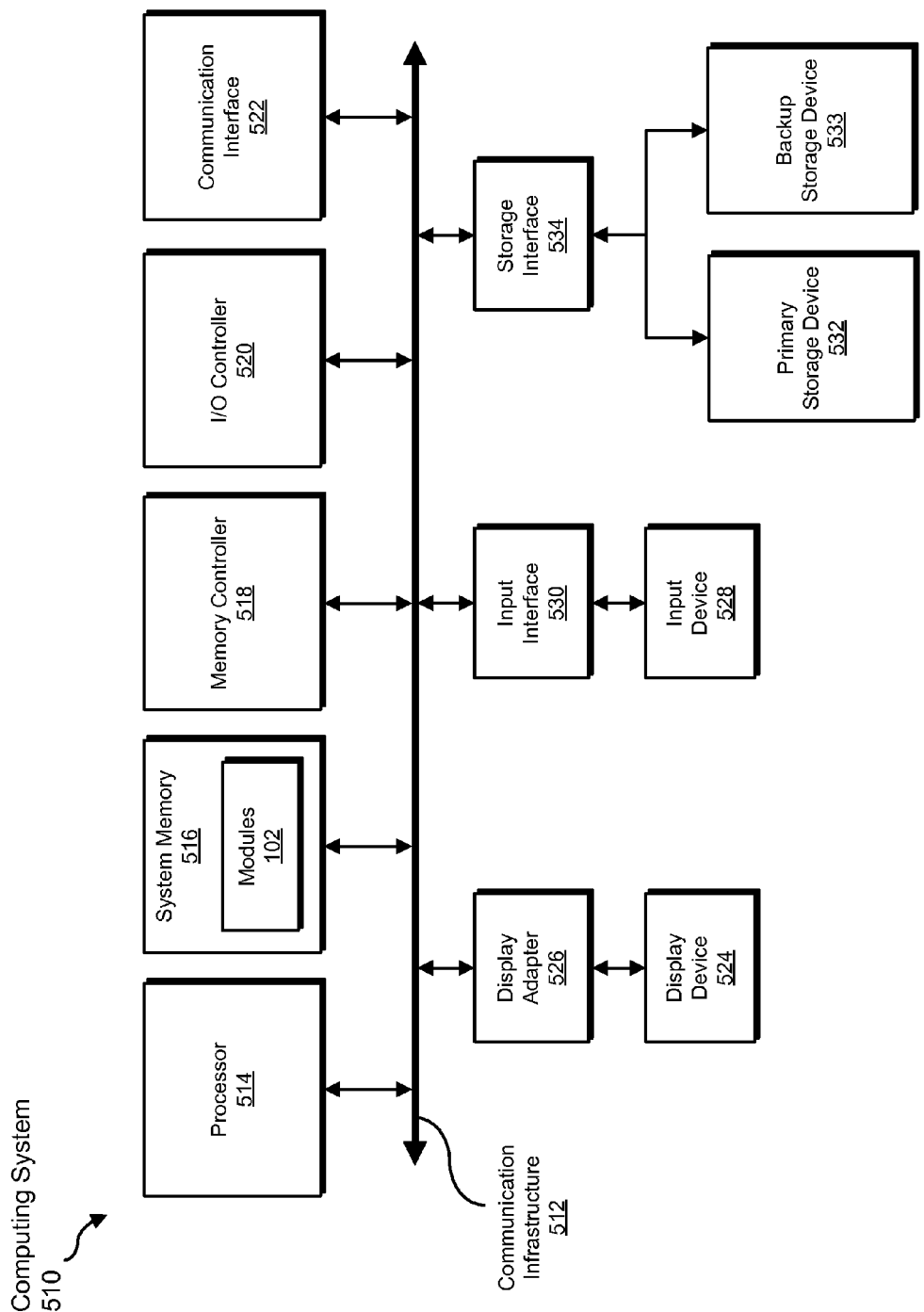
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, reading, determining, monitoring, delaying, adding, reducing, pausing, adjusting, and expediting steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
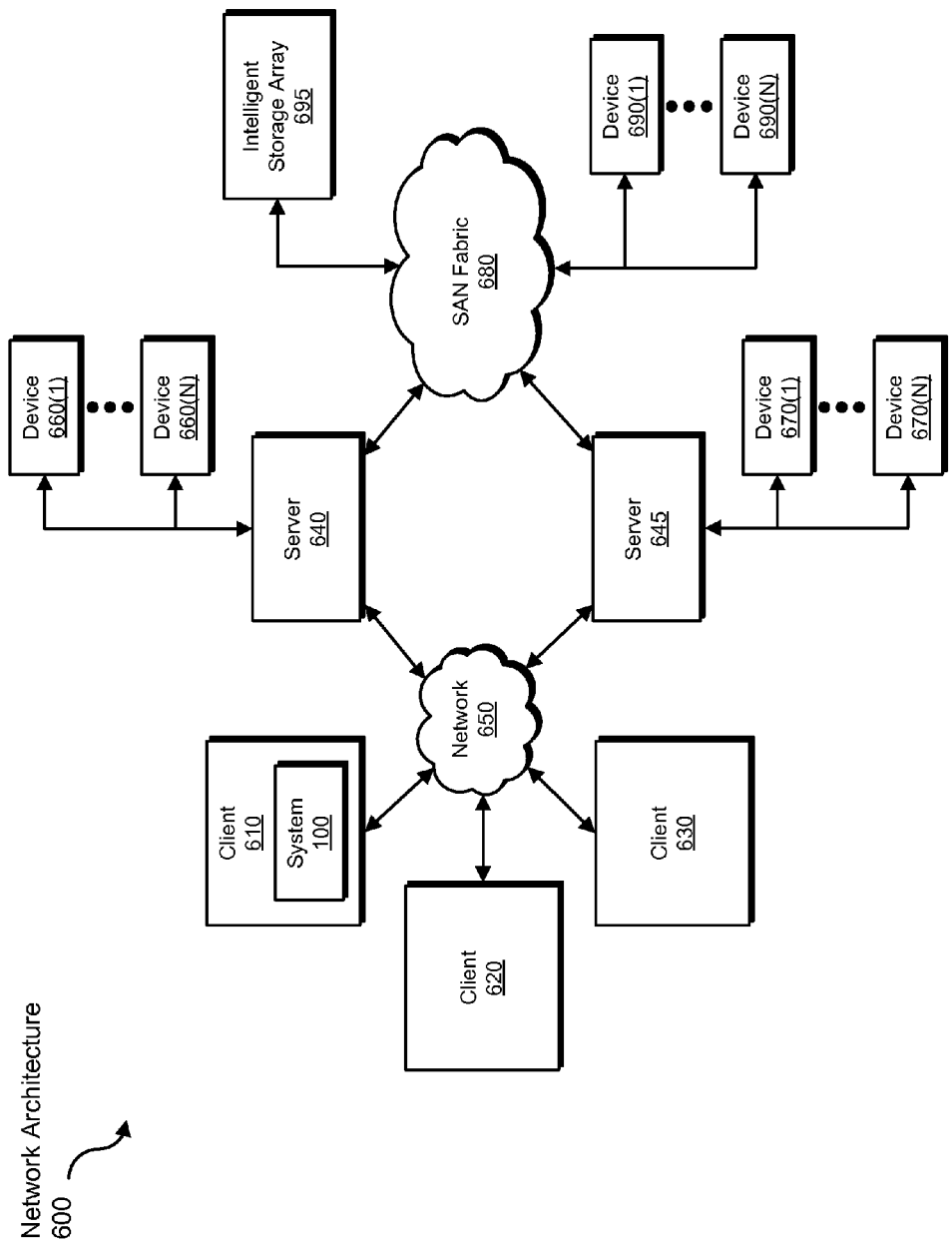
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, reading, determining, monitoring, delaying, adding, reducing, pausing, adjusting, and expediting steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for adaptively performing backup operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for adaptively performing backup operations. As another example, one or more of the modules recited herein may transform a storage device into a storage device for facilitating the adaptive performance of backup operations.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive.

Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for adaptively performing backup operations, at least a portion of the method being performed by a computing device comprising at least one processor, the method comprising:
    identifying a storage system used for storage by a plurality of virtual machines;
    identifying a request to perform a backup operation for a first virtual machine comprising at least one input/output operation, wherein the backup operation results in an increased input/output load on the storage system;
    determining that an input/output capacity of the storage system has fallen below a predetermined threshold in response to the increased input/output load resulting from the performance of the backup operation of the first virtual machine;
    identifying at least one input/output operation of a second virtual machine;
    delaying the at least one input/output operation of the second virtual machine in response to determining that the input/output capacity of the storage system has fallen below the predetermined threshold such that the at least one input/output operation of the second virtual machine does not interfere with the backup operation of the first virtual machine.

2. The computer-implemented method of claim 1, wherein delaying the at least one input/output operation of the second virtual machine comprises reducing a bandwidth of input/output operations performed by the second virtual machine such that additional bandwidth is available for the first virtual machine.

3. The computer-implemented method of claim 1, wherein delaying the at least one input/output operation of the second virtual machine comprises:
    creating a checkpoint in the backup operation of the first virtual machine;
    pausing the backup operation of the first virtual machine for a predefined duration of time;
    resuming the backup operation of the first virtual machine from the checkpoint after the predefined duration of time.

4. The computer-implemented method of claim 1, wherein determining that the input/output capacity of the storage system has fallen below the predetermined threshold comprises monitoring an input/output load on the storage system.

5. The computer-implemented method of claim 1, wherein the backup operation of the first virtual machine comprises reading a snapshot of data to back up from the storage system.

6. The computer-implemented method of claim 1, wherein the storage system comprises a storage cluster for the plurality of virtual machines.

7. The computer-implemented method of claim 1, further comprising:
    adding the determination that the input/output capacity of the storage system has fallen below the predetermined threshold to an input/output load history for the storage system;
    adjusting a backup schedule for at least one future backup operation involving the storage system based on the input/output load history for the storage system.

8. The computer-implemented method of claim 1, further comprising:
    determining that the input/output capacity of the storage system has exceeded an additional predetermined threshold;
    expediting an additional input/output operation for the backup operation of the first virtual machine based on determining that the input/output capacity of the storage system has exceeded the additional predetermined threshold.

9. The computer-implemented method of claim 1, wherein:
    the request to perform the backup operation for the first virtual machine comprises a request to copy a snapshot from the storage system to a backup storage location;
    the input/output operation comprises a read operation performed on the storage system.

10. The computer-implemented method of claim 1, wherein:
    the request to perform the backup operation for the first virtual machine comprises a request to restore a backup to the storage system;
    the input/output operation comprises a write operation to the storage system.

11. A system for adaptively performing backup operations, the system comprising:
    an identification module programmed to identify a storage system used for storage by a plurality of virtual machines;
    a request module programmed to identify a request to perform a backup operation for a first virtual machine comprising at least one input/output operation, wherein the backup operation results in an increased input/output load on the storage system;
    a determination module programmed to determine that an input/output capacity of the storage system has fallen below a predetermined threshold in response to the increased input/output load resulting from the performance of the backup operation of the first virtual machine;

an additional identification module programmed to identify at least one input/output operation of a second virtual machine;

a delay module programmed to delay at least one input/output operation of the second virtual machine in response to determining that the input/output capacity of the storage system has fallen below the predetermined threshold such that the at least one input/output operation of the second virtual machine does not interfere with the backup operation of the first virtual machine;

at least one processor configured to execute the identification module, the request module, the determination module, the additional identification module, and the delay module.

12. The system of claim 11, wherein the delay module is programmed to delay the at least one input/output operation of the second virtual machine by reducing a bandwidth of input/output operations performed by the second virtual machine such that the additional bandwidth is available for the first virtual machine.

13. The system of claim 11, wherein the delay module is programmed to delay the at least one input/output operation of the second virtual machine by:

creating a checkpoint in the backup operation of the first virtual machine;

pausing the backup operation of the first virtual machine for a predefined duration of time;

resuming the backup operation of the first virtual machine from the checkpoint after the predefined duration of time.

14. The system of claim 11, wherein the determination module is programmed to determine that the input/output capacity of the storage system has fallen below the predetermined threshold by monitoring an input/output load on the storage system.

15. The system of claim 11, wherein the backup operation of the first virtual machine comprises reading a snapshot of data to back up from the storage system.

16. The system of claim 11, wherein the storage system comprises a storage cluster for the plurality of virtual machines.

17. The system of claim 11, wherein the delay module is further programmed to:

add the determination that the input/output capacity of the storage system has fallen below the predetermined threshold to an input/output load history for the storage system;

adjust a backup schedule for at least one future backup operation involving the storage system based on the input/output load history for the storage system.

18. The system of claim 11, wherein the delay module is further programmed to:

determine that the input/output capacity of the storage system has exceeded an additional predetermined threshold;

expedite an additional input/output operation for the backup operation of the first virtual machine based on determining that the input/output capacity of the storage system has exceeded the additional predetermined threshold.

19. The system of claim 11, wherein:

the request to perform the backup operation of the first virtual machine comprises a request to copy a snapshot from the storage system to a backup storage location;

the input/output operation comprises a read operation performed on the storage system.

20. A non-transitory computer-readable-storage medium comprising one or more computer-executable instructions that, when executed by at least one processor of a computing device, cause the computing device to:

identify a storage system used for storage by a plurality of virtual machines;

identify a request to perform a backup operation for a first virtual machine comprising at least one input/output operation, wherein the backup operation results in an increased input/output load on the storage system;

determine that an input/output capacity of the storage system has fallen below a predetermined threshold in response to the increased input/output load resulting from the performance of the backup operation of the first virtual machine;

identify at least one input/output operation of a second virtual machine;

delay the at least one input/output operation of the second virtual machine in response to determining that the input/output capacity of the storage system has fallen below the predetermined threshold such that the input/output operation of the second virtual machine does not interfere with the backup operation of the first virtual machine.

* * * * *